(12) United States Patent
Kaestner et al.

(10) Patent No.: US 7,832,261 B2
(45) Date of Patent: Nov. 16, 2010

(54) METHOD FOR RECOGNIZING THE SATURATION POINT OF A VACUUM BRAKE BOOSTER

(75) Inventors: Frank Kaestner, Bietigheim-Bissingen (DE); Thomas Bruex, Northville, MI (US); Andreas Grimm, Tiefenbronn-Muehlhausen (DE); Otmar Bussmann, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 379 days.

(21) Appl. No.: 11/883,995

(22) PCT Filed: Jan. 24, 2006

(86) PCT No.: PCT/EP2006/050383

§ 371 (c)(1),
(2), (4) Date: Apr. 24, 2008

(87) PCT Pub. No.: WO2006/092348

PCT Pub. Date: Sep. 8, 2006

(65) Prior Publication Data

US 2009/0044614 A1    Feb. 19, 2009

(30) Foreign Application Priority Data

Mar. 2, 2005    (DE) .................... 10 2005 009 423

(51) Int. Cl.
*G01M 17/007* (2006.01)
(52) U.S. Cl. ..................................... 73/121
(58) Field of Classification Search ............. 73/121, 73/128, 129
See application file for complete search history.

(56) References Cited

U.S. PATENT DOCUMENTS

| 6,715,846 | B1 * | 4/2004 | Pueschel et al. .......... 303/114.3 |
|---|---|---|---|
| 6,948,416 | B2 * | 9/2005 | Marlhe et al. ............. 91/376 R |
| 7,188,517 | B2 * | 3/2007 | Kerns et al. ................... 73/121 |
| 2001/0035166 | A1 * | 11/2001 | Kerns et al. .................. 123/494 |
| 2003/0177822 | A1 * | 9/2003 | Kerns ......................... 73/118.1 |
| 2004/0162652 | A1 * | 8/2004 | Kerns et al. .................... 701/34 |
| 2004/0251739 | A1 * | 12/2004 | Quirant et al. ............... 303/155 |
| 2004/0254708 | A1 * | 12/2004 | Marlhe et al. ................. 701/70 |
| 2008/0127742 | A1 * | 6/2008 | Mueller et al. ................ 73/756 |

FOREIGN PATENT DOCUMENTS

| DE | 195 25 985 | 1/1997 |
|---|---|---|
| DE | 196 32 130 | 1/1998 |
| WO | WO 99/38741 | 8/1999 |

* cited by examiner

*Primary Examiner*—Eric S McCall
(74) *Attorney, Agent, or Firm*—Kenyon & Kenyon LLP

(57) ABSTRACT

A device for determining the saturation point of a vacuum brake booster having a vacuum chamber and a working chamber that are separated from one another by a membrane. The reaching of the saturation point can be recognized simply and precisely if the vacuum prevailing in the vacuum chamber is measured using a pressure sensor, and the output signal of the pressure sensor is evaluated by an electronic evaluation system that calculates the saturation point using a mathematical function, taking into account only the pressure prevailing in the vacuum chamber.

12 Claims, 3 Drawing Sheets

METHOD FOR RECOGNIZING THE SATURATION POINT OF A VACUUM BRAKE BOOSTER

FIELD OF THE INVENTION

The present invention relates to a device for determining the saturation point of a vacuum brake booster, as well as to a corresponding method.

BACKGROUND INFORMATION

Vacuum brake boosters are used to amplify the braking force exerted on the foot brake pedal of a motor vehicle. Due to their simple and economical construction, they are the most widely used type of booster in motor vehicles.

FIG. 1 shows a schematic representation of a conventional vacuum brake booster (VBB) known from the prior art. The VBB essentially includes a working chamber 2, a vacuum chamber 1 having a vacuum connection 3 and a membrane 7 that divides the two chambers 1, 2 from one another. At vacuum connection 3, a vacuum source (not shown) is connected that is for example driven by the internal combustion engine and that produces a predetermined vacuum in vacuum chamber 1. In the central area of VBB 8, a double valve 4 is situated that performs two functions, namely a) dividing working chamber 2 from vacuum chamber 1, or connecting the two chambers 1, 2 to one another, and b) ventilating working chamber 2, or separating it from the air of the surrounding environment.

In the unbraked state, the connection between vacuum chamber 1 and working chamber 2 is open. Thus, the same vacuum prevails in both chambers 1, 2. When there is an actuation of the foot brake pedal, the two chambers 1, 2 are separated from one another, and working chamber 2 is ventilated. Dependent on braking force F exerted via piston rod 6, a pressure level arises that is between the vacuum in vacuum chamber 1 and the environmental pressure. The force resulting from the pressure difference acting on working membrane 7 amplifies the braking force exerted on the brake pedal. The auxiliary force portion produced by VBB 8 is essentially dependent on the constructive design of VBB 8 and on the vacuum prevailing in vacuum chamber 1. After the release of the brake pedal, the ventilation with environmental air is interrupted, and the chamber valve is again open. In this way, both chambers 1, 2 are charged with a vacuum from the vacuum source.

FIG. 2 shows a typical transmission characteristic of a VBB 8, showing the brake pressure p (pre-pressure) acting in the brake system over the force F exerted on the foot brake pedal. VBB 8 begins operation starting from a predetermined minimum force $F_0$ that is required for the actuation of the mechanical components, and then amplifies brake pressure p in linear fashion with increasing braking force F. Here, the gain factor is designated k. In the linear area of the characteristic curve, the auxiliary force portion increases constantly up to a saturation point 11 (AP). At saturation point 11, the maximum pressure difference between working chamber 2 and vacuum chamber 1 is reached. Environmental air pressure then prevails in working chamber 2. If the braking force F on the foot brake pedal is increased further, brake pressure p increases only without amplification.

Conventional VBBs 8 are standardly constructed in such a way that the saturation point 11 is not exceeded, or is not significantly exceeded, even given maximum actuation of the foot brake pedal. However, in the case of VBBs 8 that are dimensioned too small, or if there is an insufficient vacuum supply in vacuum chamber 1, saturation point 11' lies below blocking pressure level 14. In this case, braking force F continues to be linearly amplified only up to saturation point AP', and is subsequently transmitted only in unamplified fashion (line 13). This has the result that after saturation point AP' has been exceeded, a further increase in the braking force requires a significantly increased exertion of force on the brake pedal.

In order to remove this problem, it is known to switch over to a hydraulic booster system when saturation point 11 has been reached, and to activate the hydraulic modulator of a vehicle dynamics regulation system (e.g. ESP) in order to build up additional brake pressure. For this, it is necessary to recognize the saturation point precisely and to switch over to hydraulic boosting at the right point in time.

From the prior art, it is known to measure the pressure difference between working chamber 2 and vacuum chamber 1 using a pressure sensor 9b situated in working chamber 2 and a pressure sensor 9a situated in vacuum chamber 1, and to switch over to hydraulic boosting when a maximum pressure difference has been achieved. However, this requires two pressure sensors, which is relatively expensive.

SUMMARY OF THE INVENTION

An object of the present invention is therefore to recognize the saturation point with a lower expense for sensors.

An important idea of the present invention is to provide a pressure sensor only in the vacuum chamber, and to calculate the saturation point from the vacuum chamber pressure alone, using a mathematical function. Preferably, no pressure sensor is provided in the working chamber of the vacuum brake booster.

When the brake pressure prevailing in the brake system (which can for example be measured using a pre-pressure sensor) reaches the calculated saturation point, a switchover to hydraulic boosting preferably takes place automatically, or the hydraulic boosting is deactivated. The calculation of the saturation point using a mathematical function has the significant advantage that the saturation point can be determined using only a single pressure sensor. This makes it possible to achieve a transition between pneumatic and hydraulic boosting that is not perceptible to the driver.

The mathematical function for calculating the saturation point $p_{ap}$ is preferably a linear equation having the form:

$$p_{ap} = m \cdot p_v + b$$

where $p_{ap}$ is the brake pressure at the saturation point, $p_v$ is the vacuum prevailing in the vacuum chamber, and m, b are two variables.

Variables m, b are dependent on the design of the vacuum brake booster, and must at first be calibrated separately for each type. For this purpose, in test operation the following calibration method is preferably carried out:

First, the working chamber is ventilated, and the pressure difference between the working chamber and the vacuum chamber is built up until the saturation point has definitely been exceeded. Subsequently, the pressure difference is dismantled, and the output signal of the vacuum chamber pressure sensor is evaluated during the dismantling. The saturation point is situated precisely at the point at which the pressure curve in the vacuum chamber shows a minimum. The vacuum prevailing at the saturation point, as well as the brake pressure (e.g. pre-pressure), is then stored, the two values (vacuum chamber pressure and brake pressure) forming a first value pair. The named method steps are then repeated at least a second time at a different vacuum chamber pressure. From this there results at least one second value pair (vacuum chamber pressure/brake pressure). With two value pairs, the linear equation stated above is unambiguously determined, and the parameters m, b can be calculated.

During driving operation of the vehicle, saturation point $p_{ap}$ is preferably recalculated at regular intervals dependent on the vacuum chamber pressure. If, during a braking maneuver, the brake pressure reaches the calculated saturation point, the hydraulic brake boosting can be activated or deactivated at precisely the correct point in time.

The function for calculating the saturation point is preferably stored in a control device and is calculated by this device. The control device is preferably connected to the pressure sensor situated in the vacuum chamber and to a pre-pressure sensor for measuring the brake pressure.

DETAILED DESCRIPTION

Figure 1:
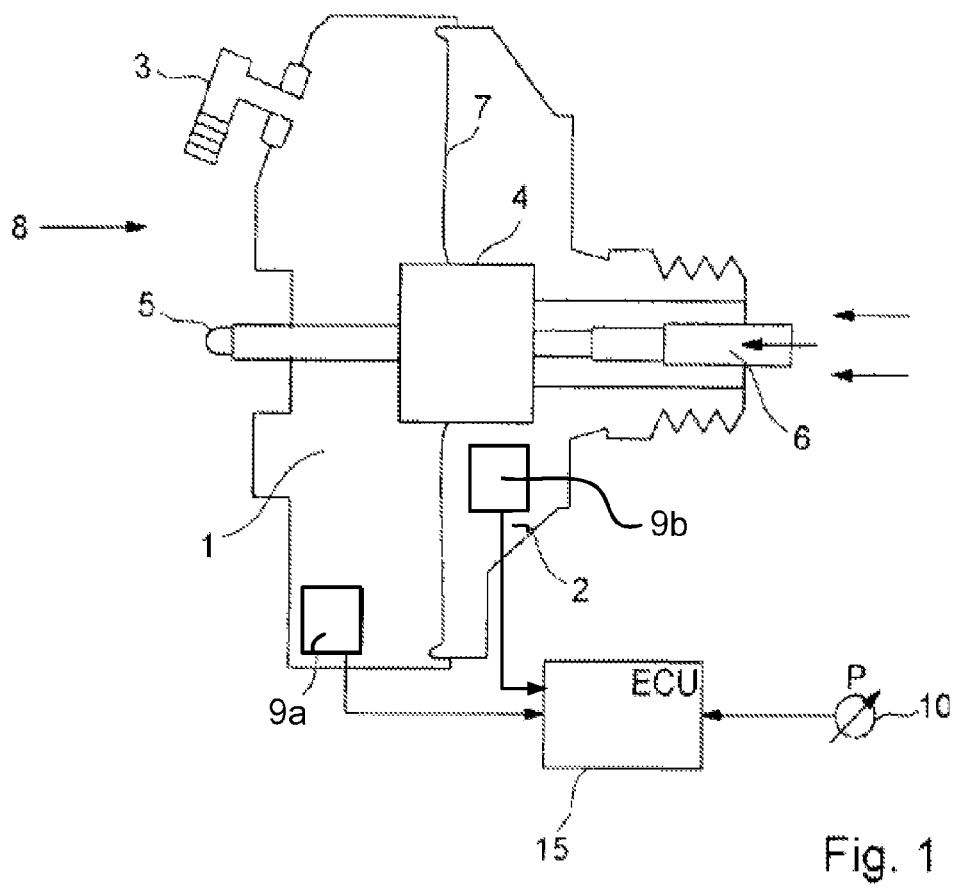
FIG. 1 shows a schematic representation of a vacuum brake booster known from the prior art.
Figure 5:
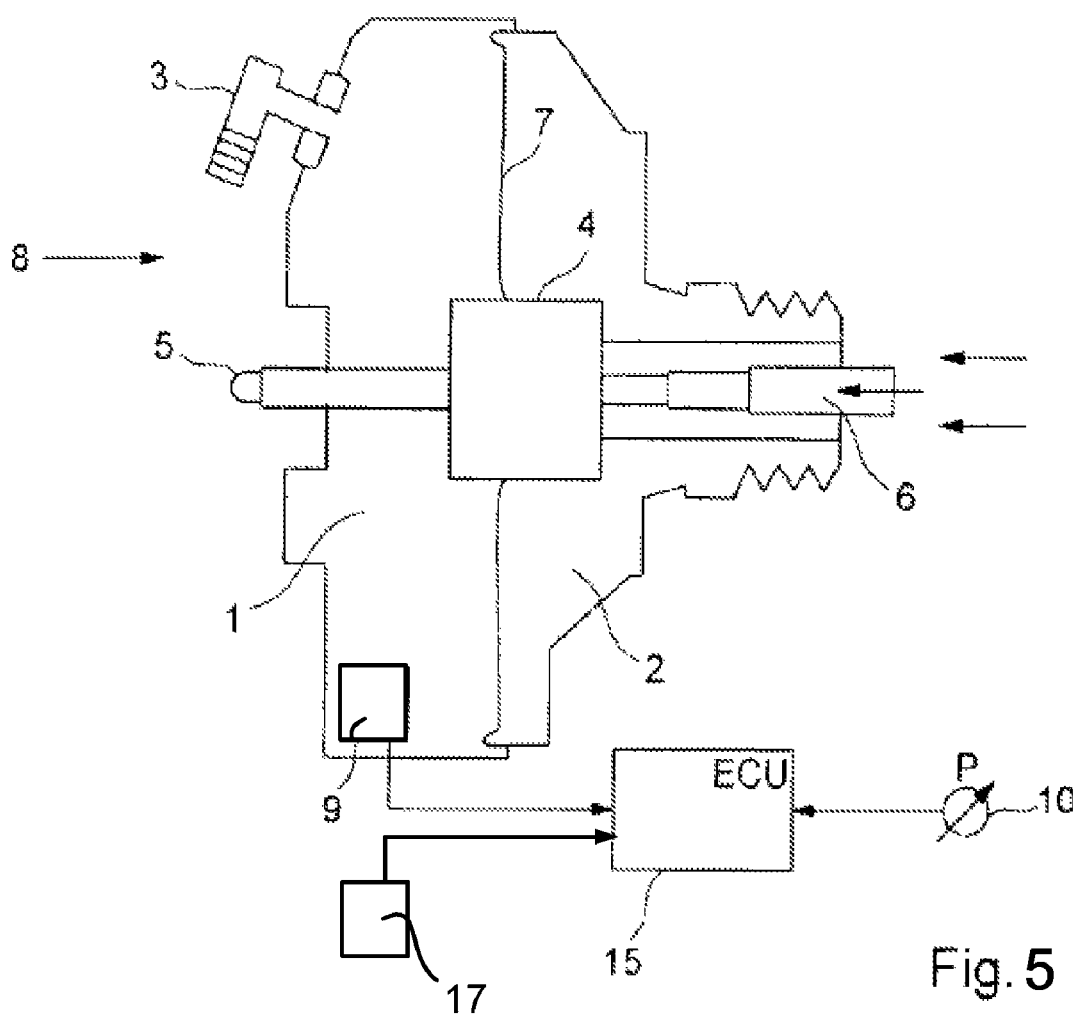
FIG. 5 shows a schematic representation of a vacuum brake booster, according to an example embodiment of the present invention.

FIG. 1 shows a vacuum brake booster 8 (VBB) known from the prior art. With regard to the technical explanation, reference is made to the "Background Information" section. In contrast to known VBBs, the depicted VBB 8 of FIG. 5 has a sensor mechanism for determining saturation point 11. This sensor mechanism includes a pressure sensor 9 situated in vacuum chamber 1, whose output signal is evaluated by a control device 15. Control device 15 calculates saturation point 11 on the basis of a mathematical function that approximates the boosting behavior of VBB 8 using a linear equation, as follows:

$$p_{ap} = m \cdot p_v + b$$

$p_{ap}$ being the brake pressure at the saturation point, $p_v$ being the vacuum prevailing in the vacuum chamber, and m, b being two variables.

Figure 2:
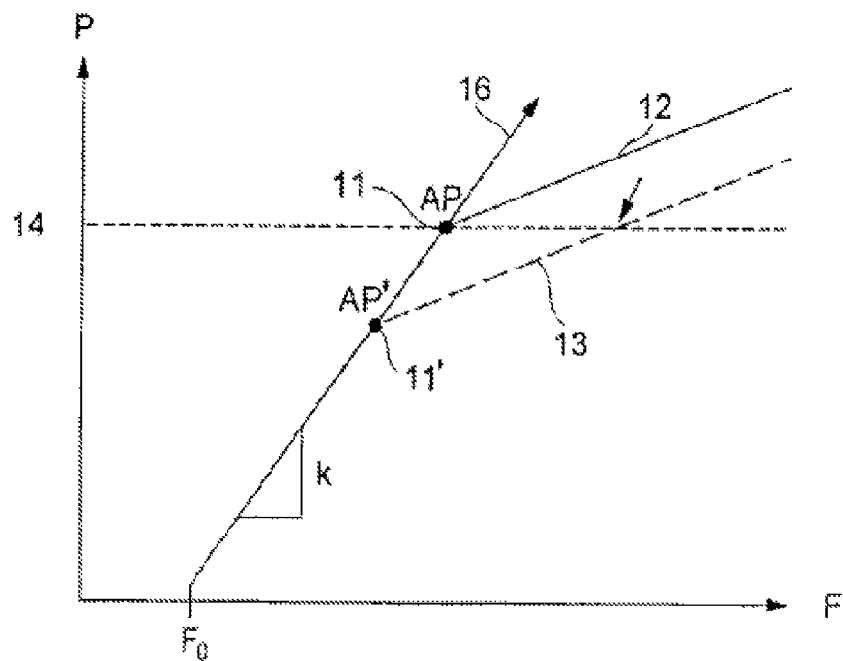
FIG. 2 shows a typical amplification characteristic curve of a vacuum brake booster.

When brake pressure p prevailing in the brake system is equal to the calculated value $p_{AP}$, the saturation point has been reached. In this case, for example a hydraulic modulator (not shown) can be activated or deactivated in order to automatically switch a hydraulic boosting of brake pressure p on or off, so that brake pressure p runs along line 16 (see FIG. 2). The brake pressure p prevailing in the brake system is measured for example using a pre-pressure sensor 17 that is likewise connected to control device 15. The continuous brake force boosting is not interrupted by this.

Figure 3:
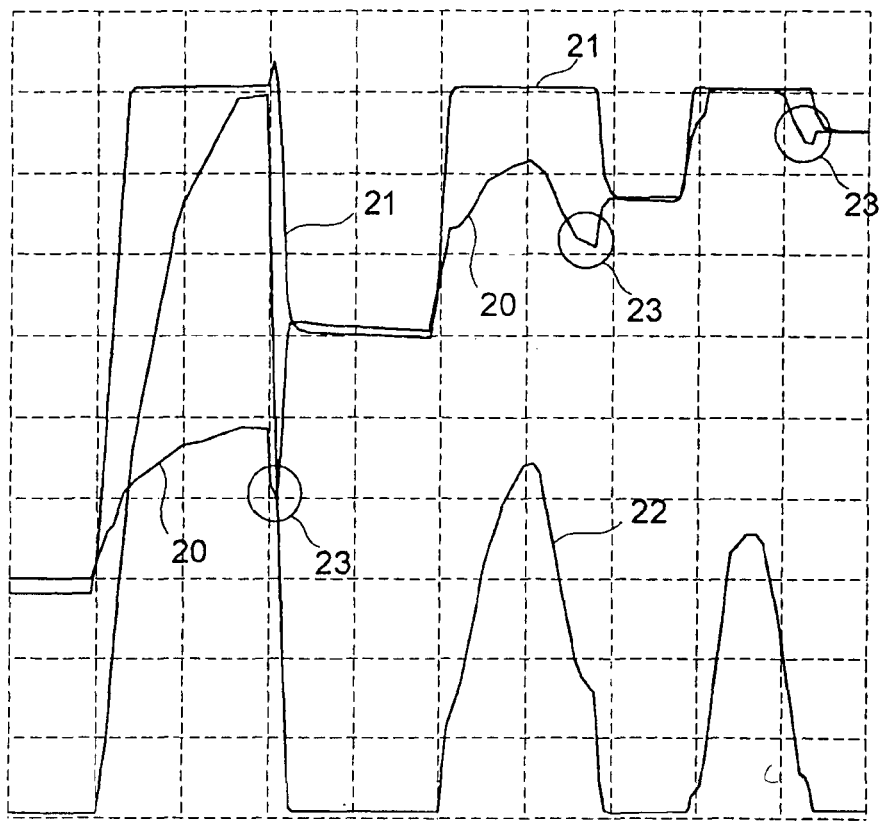
FIG. 3 shows the curve of different characteristic quantities.

FIG. 3 shows various pressure curves in the braking system, reference character 20 designating the pressure curve in vacuum chamber 1 (output signal of pressure sensor 9), reference character 21 designating the pressure prevailing in the working chamber, and reference character 22 designating the brake pressure (pre-pressure). Air pressure values 20, 21 are plotted relative to the environmental pressure, which is at the level of the upper plateau of working chamber pressure 21. The pressure curve is described in more detail below.

Figure 4:
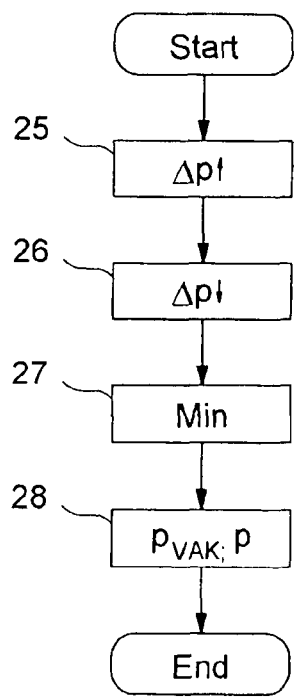
FIG. 4 shows the method steps of a calibrating method.

Variables m, b of the booster function are different from booster to booster, and must first be calibrated. This can be carried out using a calibration method, an example of which is shown in FIG. 4.

In step 25, first working chamber 2 is ventilated and the difference pressure between the two chambers 1, 2 is increased until saturation point 11 has definitely been exceeded. In FIG. 3, this is indicated as the reaching of a plateau in working chamber pressure 21, where the pressure is equal to the environmental air pressure.

The pressure difference is then dismantled in step 26, and the output signal of pressure sensor 9 is evaluated during this process (characteristic line 20). The boost characteristic of FIG. 2 runs in the backward direction from top to bottom. Through the reduction in the braking force, at first the volume of vacuum chamber 1 increases and the pressure 20 in vacuum chamber 1 decreases. The reaching of saturation point 11 is characterized by a minimum 23 in the pressure curve 20. Precisely at the minimum 23, valve 4 between chambers 1, 2 opens, and a pressure compensation between chambers 1, 2 takes place. This in turn results in an increase in the pressure 20 in vacuum chamber 1. (Due to the lack of a vacuum source in this example, vacuum chamber pressure 20 remains at this level.)

Minimum 23 in pressure curve 20 is detected in step 27 by signal evaluation.

Vacuum chamber pressure 20 prevailing at saturation point 11, and brake pressure p prevailing in the brake system at this point in time, are then stored in step 28. The above-named method steps are subsequently repeated at least once, and a new value pair (vacuum chamber pressure/brake pressure) is measured. With two value pairs, the above-named function is unambiguously determined, so that parameters m, b can be calculated.

Saturation point $p_{AP}$ can thus be recognized precisely at any time during operation of the vehicle, in such a way that only the vacuum prevailing in vacuum chamber 1 need be taken into account. An additional pressure sensor in working chamber 2 of VBB 8 can be omitted.

| List of reference characters | |
|---|---|
| 1 | vacuum chamber |
| 2 | working chamber |
| 3 | vacuum connection |
| 4 | double valve |
| 5 | pressure rod |
| 6 | piston rod |
| 7 | working membrane |
| 8 | vacuum brake booster |
| 9 | pressure sensor |
| 10 | brake pressure sensor |
| 11 | saturation point |
| 12 | unamplified area |
| 13 | unamplified area with reduced vacuum |
| 14 | blocking brake pressure |
| 15 | control device |
| 16 | boosting line |
| 20 | pressure in the vacuum chamber |
| 21 | pressure in the working chamber |
| 22 | brake pressure curve |
| 25-28 | method steps |
| p | brake pressure |

What is claimed is:

1. A device for determining a saturation point of a vacuum brake booster having a vacuum chamber and a working chamber, the device comprising:

a pressure sensor arranged for measuring a pressure prevailing in the vacuum chamber; and an electronic evaluation system, connected to the pressure sensor, for calculating the saturation point with the aid of a mathematical function, on the basis of the pressure prevailing in the vacuum chamber;

wherein the mathematical function has a plurality of parameters that are calibrated using a calibration method in which a pressure difference between the working chamber and the vacuum chamber is increased in a first step until the saturation point has definitely been exceeded, and the pressure difference is subsequently dismantled, an output signal of the pressure sensor being evaluated during the dismantling and the saturation point being detected, and a vacuum prevailing in the vacuum chamber at the saturation point, as well as a brake pressure, being stored in order to calibrate the parameters.

2. The device according to claim 1, wherein no pressure sensor is provided in the working chamber of the vacuum brake booster.

3. The device according to claim 1, wherein the vacuum chamber and the working chamber are separated from one another by a membrane.

4. The device according to claim 1, wherein the saturation point is detected when a pressure signal of the pressure sensor is at a minimum.

5. The device according to claim 1, wherein the mathematical function is the following:

$$p_{ap}=m \cdot p_v+b.$$

6. The device according to claim 1, wherein the method steps are carried out at least twice.

7. A method for determining a saturation point of a vacuum brake booster having a vacuum chamber and a working chamber, comprising:

measuring a pressure prevailing in the vacuum chamber, using a pressure sensor; and calculating the saturation point with the aid of a mathematical function, on the basis of the pressure prevailing in the vacuum chamber;

wherein the mathematical function has a plurality of parameters that are calibrated using a calibration method in which a pressure difference between the working chamber and the vacuum chamber is increased in a first step until the saturation point has definitely been exceeded, and the pressure difference is subsequently dismantled, an output signal of the pressure sensor being evaluated during the dismantling and the saturation point being detected, and a vacuum prevailing in the vacuum chamber at the saturation point, as well as a brake pressure, being stored in order to calibrate the parameters.

8. The method according to claim 7, wherein the saturation point is detected when a pressure signal of the pressure sensor is at a minimum.

9. The method according to claim 7, wherein the mathematical function is the following:

$$p_{ap}=m \cdot p_v+b.$$

10. The method according to claim 7, wherein the method steps are carried out at least twice.

11. The method according to claim 7, wherein no pressure sensor is provided in the working chamber of the vacuum brake booster.

12. The method according to claim 7, wherein the vacuum chamber and the working chamber are separated from one another by a membrane.

* * * * *